US007654790B2

(12) United States Patent
Molbech

(10) Patent No.: US 7,654,790 B2
(45) Date of Patent: Feb. 2, 2010

(54) WIND TURBINE LIGHTNING CONNECTION MEANS METHOD AND USE HEREOF

(75) Inventor: Allan Laursen Molbech, Lem St (DK)

(73) Assignee: Vestas Wind Systems A/S (DK)

( * ) Notice: Subject to any disclaimer, the term of this patent is extended or adjusted under 35 U.S.C. 154(b) by 833 days.

(21) Appl. No.: 10/580,220

(22) PCT Filed: Nov. 20, 2003

(86) PCT No.: PCT/DK03/00799

§ 371 (c)(1),
(2), (4) Date: May 19, 2006

(87) PCT Pub. No.: WO2005/050008

PCT Pub. Date: Jun. 2, 2005

(65) Prior Publication Data

US 2009/0038819 A1    Feb. 12, 2009

(51) Int. Cl.
*F04D 27/02*    (2006.01)
(52) U.S. Cl. .................... 415/1; 416/146 R; 416/908
(58) Field of Classification Search .................. 415/4.3, 415/4.5, 908; 416/146 R, 230; 29/44, 55
See application file for complete search history.

(56) References Cited

U.S. PATENT DOCUMENTS 377,742 A * 2/1888 Daniels ..................... 174/2
6,932,574 B2 * 8/2005 Wobben ................. 416/146 R

FOREIGN PATENT DOCUMENTS

| EP | 0 718 495 | 6/1996 |
|---|---|---|
| EP | 1 036 937 | 9/2000 |
| EP | 1154537 A2 | 11/2001 |
| JP | 5060053 A | 3/1993 |
| WO | WO 94 25752 | 11/1994 |
| WO | WO 96 07825 | 3/1996 |

OTHER PUBLICATIONS

International Search Report; PCT/DK03/000799; Jul. 8, 2004.

* cited by examiner

*Primary Examiner*—Edward Look
*Assistant Examiner*—Aaron R Eastman
(74) *Attorney, Agent, or Firm*—St. Onge Steward Johnston & Reens LLC

(57) ABSTRACT

The invention relates to a wind turbine (1) comprising stationary means such as a nacelle (3) and a tower (2) comprising stationary lightning protection means (46), and rotating means such as a rotor including at least one wind turbine blade (5) and shaft means (14), each of said at least one wind turbine blade (5) comprising rotating lightning protection means (47). The stationary and rotating lightning protection means (46, 47) comprise contact surfaces (17, 18) connected by lightning connection means (15). The lightning connection means (15) comprises at least two contact means (19, 19a, 19b) adapted for connecting said rotating and stationary lightning protection means (46, 47). Further, it comprises at least one electric conductor (30) establishing a dedicated connection between said at least two contact means (19, 19a, 19b) and force transferring means (26, 27) for said at least two contact means (19, 19a, 19b) establishing a continuous connection between said at least two contact means (19, 19a, 19b) and the contact surfaces (17, 18) of said stationary and rotating lightning protection means (46, 47). The invention also relates to lightning connection means (15) for a wind turbine (1), a method and use hereof.

40 Claims, 13 Drawing Sheets

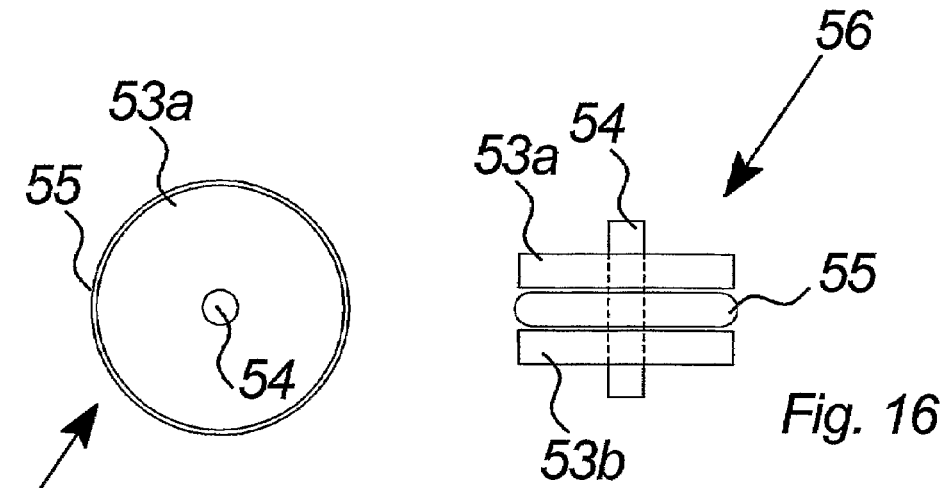
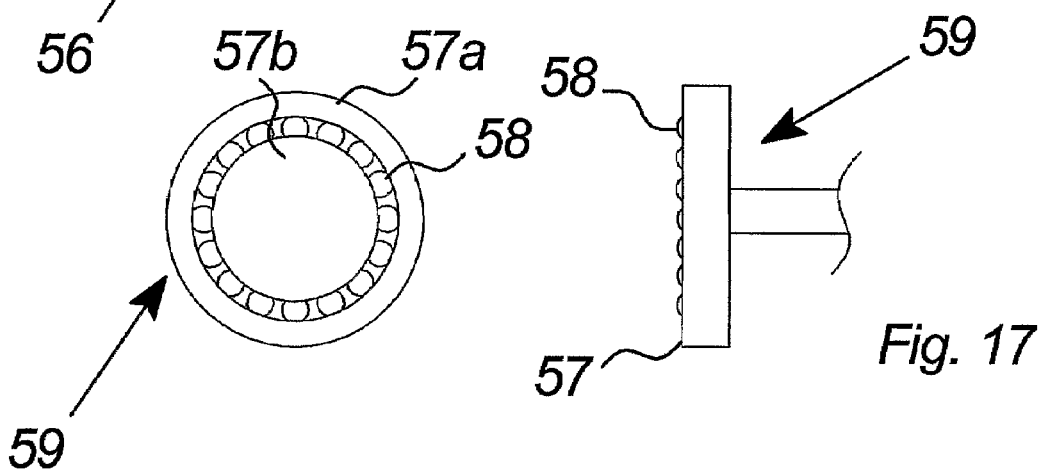
Fig. 16
Fig. 17
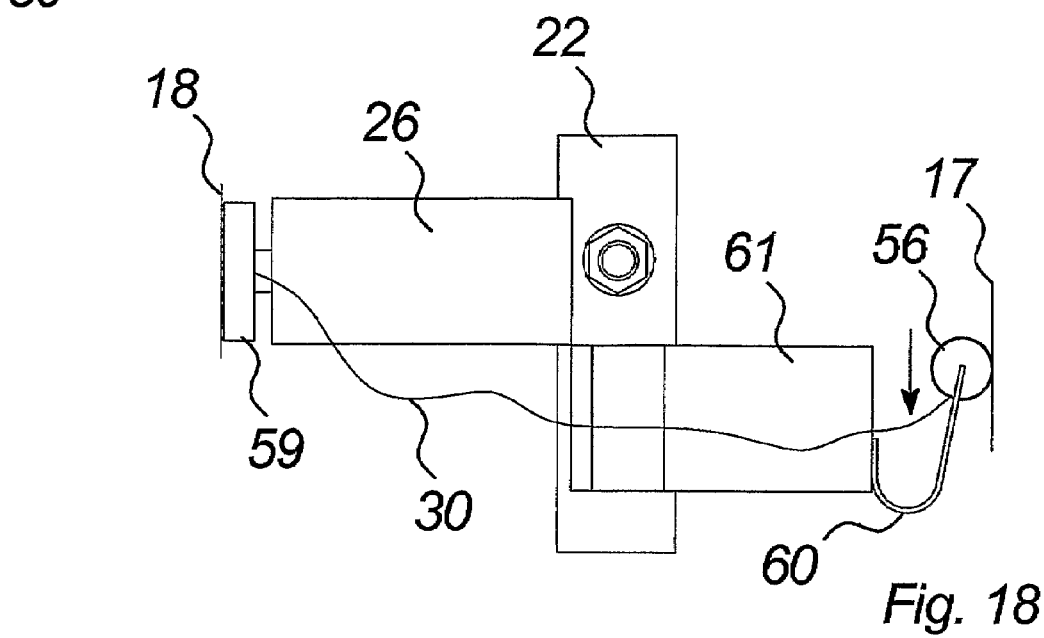
Fig. 18

WIND TURBINE LIGHTNING CONNECTION MEANS METHOD AND USE HEREOF

BACKGROUND OF THE INVENTION

The invention relates to a wind turbine according to the preamble of claim 1, to lightning connection means according to the preamble of claim 12, method and use hereof.

DESCRIPTION OF THE RELATED ART

Typically, wind turbines are erected in areas with superior wind conditions such as rural areas comprising only a few tall obstacles e.g. trees or buildings. However, wind turbines are erected with increasingly higher towers and rotor blades in order to take the most efficient use of the wind and, with wind turbines being the tallest objects in an area, protection of the wind turbines against lightning strokes is thus a necessity.

A well-known lightning protecting system for a wind turbine involves a lightning receptor at the tip of every rotor blade in order to capture the lightning stroke. The lightning is discharged to a ground potential via a down conductor inside the blade and down conductors in the nacelle and tower. In order to transfer the lightning from the down conductor of the rotating blade to the down conductor of the stationary nacelle the lightning current is lead through the rotor blade shaft to the nacelle. The nacelle comprises means e.g. slip-rings which are connected to the shaft and thus allows the current to be removed from the shaft and transferred to the down conductor of the nacelle.

A problem with the above-mentioned system is the fact that the lightning current in its passage from the rotor blade to the nacelle flows via different components of the wind turbine such as the blade pitching means as well as the gear means. The significant energy in the lightning may cause great harm to the components e.g. by arc formations and thus reduce the lifespan of the components.

Further, the means connected to the shaft has proven to be rather inefficient in removing the lightning current from the shaft. This means that large parts of the lightning current find alternative and often undesired and destructive routes to the ground potential.

Lightning systems with different ways of transferring the lightning current from the rotating means to the stationary means of wind turbines have been suggested.

An example is disclosed in EP patent application no. 1 154 537 in which the transfer of lightning current between the lightning protection system of a rotating blade and the nacelle is obtained by a sliding contact. The fixed part of the contact is connected to the nacelle and has spring engaged means in order to establish a sliding contact to a steel ring connected to the rotor blades. In an embodiment of the invention the steel ring and the lightning protection system of each rotor blade are connected to opposite contact plates. Hereby, it is possible to pitch a rotor blade and still maintain the lightning protection of the blade.

A problem with the lightning protection system of the EP patent application is the fact that the surfaces of the contacts quickly wear down and loose contact as they only comprise little opportunity of adapting to changes. The lightning current is hereafter at best transferred as electric arcs between the contact surfaces and thus deteriorating and eventually destroying the contacts.

A further problem is the complex and delicate mechanical construction of the lightning protection system involving a number of separate sections connected by cables. This makes the system less useable in connection with wind turbines due to the high risk of mechanical failures in the system.

One of the objects of the invention is to establish a lightning protection system for wind turbines without the above-mentioned disadvantage. It is especially an object of the invention to create a system that is simple in construction as well as reliable in service.

Further, it is an object of the invention to establish a lightning protection system for wind turbines that is easy to integrate and install as a part of a wind turbine.

BRIEF SUMMARY OF THE INVENTION

The invention relates to a wind turbine including lightning connection means, the means comprising at least two contact means adapted for connecting said rotating and stationary lightning protection means, at least one electric conductor establishing a dedicated connection between said at least two contact means, and force transferring means for said at least two contact means establishing a continuous connection between said at least two contact means and the contact surfaces of said stationary and rotating lightning protection means.

Hereby, a connection between the rotating and stationary lightning protection means is achieved which is simple in its mechanical construction and thus reliable in service. Especially, the use of no cables in order to establish the connections between the lightning connection means and the rotating and stationary lightning protection means, respectively, are advantageous in establishing a reliable system.

The force transferring means further ensure a continuously adapting of the contact means to changing positions of the contact surface.

Even further, is a connection between the rotating and stationary lightning protection means achieved that is easy to integrate and install as a part of the wind turbine.

In an aspect of the invention, a base support part of said lightning connection means is mounted on the rotating means. Hereby, a simpler construction is achieved due to the fact that the necessary circular contact surface may easier be established on the stationary means of the wind turbine than on the rotating means.

In another aspect of the invention, said base support part of said lightning connection means is mounted to the flange of said wind turbine blade. Hereby, it is ensured that the lightning connection means is firmly mounted in an advantageous position between the blade and the nacelle.

In a further aspect of the invention, said base support part is mounted to the flange of said wind turbine blade with use of the blade mounting bolts. By use of an existing and necessary structure in the wind turbine, the cost and complexity of the lightning connection is reduced.

The use of the blade bolts also allows retrofitting of the lightning connection means to existing wind turbines without requiring further arrangements to the wind turbine besides the establishing of contact surfaces.

In an even further aspect of the invention, each lightning connection means is connected to one wind turbine blade. By supplying each wind turbine blade with one lightning connection means, it is ensured that all blades at all times are connected to a ground potential. Especially as a lightning stroke may hit a blade in any position not just the positions in which the blade is pointing upwards.

In an aspect of the invention, the number of said lightning connection means is two in a two bladed wind turbine and three in a three bladed wind turbine. Hereby, an advantageous embodiment of the invention is achieved.

In an aspect of the invention, the contact surface of said stationary lightning protection means is connected to a ground potential.

In an aspect of the invention, the contact surface of said stationary lightning protection means is a coherent circular metal plate ring at the front of the nacelle. By the use of a coherent metal ring, it is ensured that all the wind turbine blades are always connected to the ground potential. The blades are connected to the ground potential regardless of the blades rotating or not.

However, it shall be emphasized that the metal ring may be in one piece instead of being established by sections to a coherent ring. Further, the metal plate ring may be a section of a full circle in which the ground potential contact only is present in the section part.

In an aspect of the invention, the coherent circular metal plate ring is positioned on the front side of the drainage means of the nacelle. By using the drainage means an advantageous position is ensured for the contact surface without interfering significantly with the existing parts of the wind turbine. As the drainage means usually is made in metal, the metal plate ring can easily be firmly mounted and the connection to the down conductor can easily be established.

In an aspect of the invention, the contact surface of said rotating lightning protection means is connected to lightning receptor means through lightning down conductor means. Hereby, an advantageous embodiment of the invention is achieved.

In an aspect of the invention, the contact surface of said rotating lightning protection means comprises a metal ring positioned around one wind turbine blade above the pitching mechanism. Hereby, it is ensured that the wind turbine blade may pitch freely without the lightning connection means losing contact with the contact surface. Further, the securing of the metal ring to the blade is enhanced with the surrounding of the blade.

The invention also relates to lightning connection means for a wind turbine comprising at least two contact means adapted for connecting rotating and stationary lightning protection means of said wind turbine, at least one electric conductor establishing a dedicated connection between said at least two contact means, and force transferring means for said at least two contact means.

Hereby, a connection between the rotating and stationary lightning protection means is achieved that is easy to integrate and install as a part of a wind turbine.

In an aspect of the invention, said at least two contact means form contact areas facing the contact surfaces of said rotating and stationary lightning protection means.

In an aspect of the invention, a contact means comprises at least one rod surrounded by a pad in which the surface of the at least one rod and pad mutually form the contact area. By combining at least one rod with a surrounding pad, it is possible to achieve the characteristics of both e.g. the different material characteristics of the rod and pad. Further, the pad stabilises the sliding of the rod over the contact surface ensuring that the rod is substantially perpendicular to the contact surface.

In an aspect of the invention, said at least one rod is made in a material with a high electric conductivity such as copper, aluminium, an alloy hereof, a metal graphite, electro graphite or similar materials. Hereby, a superior contact between the contact means and the conductor is ensured, as the mentioned materials are durable and have a high electric conductivity.

In an aspect of the invention, said pad is made in a material with a low friction surface such as a polymer material e.g. Teflon or nylon. Hereby, it is achieved that the contact means may slide easily over the contact surface ensuring a longer and more reliable life of the contact means.

In an aspect of the invention, a contact means comprises at least one wheel and at least one circular contact means on a common shaft. Hereby, a rotating contact to the contact surface is established ensuring that lightning is not continuously directed from the same position on the circular contact means. The risk of significant damage being inflicted to the circular contact means is thus reduced.

In an aspect of the invention, said at least one wheel is made in a flexible material such as rubber with a diameter preferably slightly larger than said at least one circular contact means. Hereby, it is ensured that the wheel establishes the contact to the contact surface but with a limit distance between the surface and the circular contact means. The limit distance ensures that the electric current of the lightning will follow the preferred route between the circular contact means and the contact surface.

In an aspect of the invention, said contact means comprises one wheel surrounded by one circular contact means on each side. Hereby, a stable and secure contact to the contact surface is established.

In an aspect of the invention, said contact means comprises a contact area including at least one recess and rotating means such as a number of bearing balls. Hereby, a continuous and stable contact to the contact surface is established as the recess and the bearing balls may be positioned in any way that has proven to be practical.

In an aspect of the invention, said force transferring means is at least one flexible link between said contact means and a base support plate. By using a flexible link, which supplies a constant force to the contact means, it is possible to continuously forcing the contact means against the contact surface.

In an aspect of the invention, said force transferring means are bendable in one direction in relation to a stable position. By being bendable in one direction, it is ensured that each contact means is continuously adapted to the position of the contact surface. Further, by the force transferring means not being bendable in other directions ensures that the contact means does not slide off the contact surface e.g. slides off sideways.

In an aspect of the invention, the contact means is moveable in at least one direction by the bending of said force transferring means and said base support part defining a fixed position for said force transferring means. The reliability is enhanced by defining just one fixed position for the force transferring means instead of several different positions in which one of the force transferring means (of the lightning connection means in question) may be damaged.

In an aspect of the invention, at least a section of said force transferring means comprises a circular shape or establish a circular shape when exposed to a force e.g. at the contact means. Hereby, it is possible to use the material stress of the force transferring means in establishing the necessary force.

In an aspect of the invention, said force transferring means is made in a flexible material.

In another aspect of the invention, said force transferring means are made in electrically insulating material such as a composite material e.g. glass fibre.

The use of flexible material such as glass fibre material ensures a high flexibility together with a high durability. The use of an electrically insulating or non-conductive material ensures that the lightning current does not use the force transferring means as an alternative path toward a ground potential.

In a further aspect of the invention, said force transferring means one or more boards with a length between 200 and 500 millimeters such as 300 millimeters, a width between 50 and 300 millimeters such as 80 millimeters and a thickness between 3 and 10 millimeters such as 5 millimeters. The preferred movement of the force transferring means may be achieved with the board shape. Further, with the mentioned data may be a higher flexibility in one direction and less in other directions be achieved.

In an aspect of the invention, said base support plate comprises at least a first and second bracket for holding at least a first and second force transferring means in which said brackets direct said force transferring means in at least two directions.

In an aspect of the invention, said force transferring means comprises at least one gas filled valve.

In an aspect of the invention, said force transferring means comprises at least one spring actuated means.

The use of gas filled valve or spring actuated means allows (in a higher degree) the lightning connection means to be adjusted after mounting e.g. adjusting the force which is transferred to the contact means.

In an aspect of the invention, at least one gas filled valve or said at least one spring actuated means comprise piston means including contact means. Hereby, a more linear transfer of force to the contact means is established.

In an aspect of the invention, said force transferring means mutually form an angle of at least 40 degrees at the brackets such as between 60 and 120 degrees and preferably circa 80 degrees. Hereby, an advantageous embodiment of the invention is achieved, especially as the forces transferred to the contact means are such that the contact to the contact surface is continuous.

In an aspect of the invention, said first and second force transferring means are attached next to each other at the base support part and move in substantially parallel directions. Hereby, it is ensured that the distance between the contact means is as short as possible without the contact means being in danger of touching each other.

In an aspect of the invention, said first and second force transferring means extend in a parallel direction from the base support part.

In an aspect of the invention, said first and second force transferring means extend angled in relation to each other from the base support part e.g. between nil and 90 degrees. A longer distance between the contact means is ensured by the mutual angling of the force transferring means. Hereby, a high degree of safety against electric sparks or arcing between the contact means is achieved.

FIGURES

The invention will be described in the following with reference to the figures in which FIG. 1 illustrates a large modern wind turbine, FIGS. 2a and 2b illustrate a wind turbine blade with a well-known lightning protection system, FIGS. 3a and 3b illustrate a lightning protection system including lightning connection means according to the invention, FIG. 4 illustrates a preferred embodiment of the lightning connection means according to the invention, FIG. 5 illustrates the contact surface of the stationary means of the wind turbine, FIG. 6 illustrates the contact surface of the rotating means of the wind turbine, FIGS. 7a to 7c illustrate different parts of the lightning connection means according to the invention, FIG. 8 illustrates a preferred embodiment of a contact means of the lightning connection means, FIG. 9 illustrates the dedicated connection between the contact means of the lightning connection means, FIG. 10 illustrates schematically the functionality of the lightning connection means.

FIGS. 11 to 13 illustrate schematically further embodiments of the lightning connection means, FIGS. 14 and 15 illustrate schematically even further embodiments of the lightning connection means FIGS. 16 and 17 illustrate schematically further embodiments of the contact means of the lightning connection means, FIG. 18 illustrates an embodiment of the lightning connection means including the contact means of FIGS. 16 and 17, and FIGS. 19a and 19b illustrate further embodiments of the force transferring means in the lightning connection means.

DETAILED DESCRIPTION

FIG. 1 illustrates a modern wind turbine 1 with a tower 2 and a wind turbine nacelle 3 positioned on top of the tower. The wind turbine rotor 5, comprising three wind turbine blades, is connected to the nacelle through the main shaft which extends out of the nacelle front.

As illustrated in the figure, wind beyond a certain level will activate the rotor due to the lift induced on the blades and allow it to rotate in a perpendicular direction to the wind. The rotation movement is converted to electric power, which is supplied to the utility grid.

FIGS. 2a and 2b illustrate a normal wind turbine blade with a well-known lightning protection system. FIG. 2a illustrates a front view of the wind turbine blade seen and FIG. 2b a side view of the blade.

FIG. 2a illustrates how the tip 6 of the wind turbine blade 5 with a metal receptor 8 intercepts the lightning stroke 7. The receptor is connected to the lightning down conductor 9 inside the wind turbine blade 5. The conductor 9 runs through the blade in the longitudinal direction and ends at the wind turbine hub 4. The lightning receptor and the lightning down conductor of the wind turbine blade are components in the rotating part of the lightning protection system in the wind turbine FIG. 2b illustrates schematically how the lightning current is transferred from the lightning down conductor to the rest of the lightning protection system. From the down conductor 9 is the lightning current transferred to the main shaft 10 through the pitching mechanism 13 or any other mechanism between the blade and the shaft. In the nacelle 3 are sliding contacts in contact with the shaft in order to remove the current from the shaft before entering the gearing means. The slip rings are connected to the stationary part of the lightning protection system in the wind turbine. The stationary part includes lightning down conductors of the nacelle and the wind turbine tower in which the conductors are mutually connected as well as connected to a ground potential 11.

FIGS. 3a and 3b illustrate a lightning protection system including lightning connection means according to the invention. The lightning connection means connects the rotating and stationary part of the lightning protection system and especially when the wind turbine rotor is rotating.

FIG. 3a illustrates the position of the lightning connection means 15 in relation to the rotating and stationary part of the lightning protection system. The lightning connection means is mounted on a section of the flange 21 of the wind turbine blade. The flange is facing the corresponding flange of the wind turbine hub and the two are connected to each other with a number of bolts. The bolts of the section, which the lightning connection means 15 covers, also go through and thus connect the lightning connection means 15 to the flanges. As the wind turbine hub is connected to the main shaft, the blade and main shaft is connected through the hub.

The lightning connection means expands from the mounting position at the rod of the wind turbine blade up in the space between the wind turbine blade and the front of the nacelle. By the lightning connection means being mounted to the wind turbine blade the lightning connection means will perform the same rotating movement as the blade i.e. a circular movement with the shaft as center.

In the present embodiment the nacelle 3 is illustrated with water drainage means 16 which is a circular and U-shaped water drain positioned around the main shaft opening of the nacelle. The drain helps draining water away from the main shaft and the main shaft opening. The drainage means makes a full circle around the main shaft opening in order also to protect against water tossed up from the rotating wind turbine blades (as further illustrated in FIG. 5).

The sidewall of the water drainage means 16 facing the wind turbine blade comprises one or more metal plates. The metal plates create a coherent circular metal plate ring on the drainage means.

The coherent ring establishes a contact surface 17 on the stationary part of the wind turbine with the same circle center and diameter as the water drainage means. Further, the ring has a width similar to the sidewall of the water drainage means in which the width corresponds to the width of the contact surface.

The coherent ring is connected to the stationary part of the lightning protection system e.g. the lightning down conductor of the nacelle. The connection may be established as a direct connection between the metal plate ring and the down conductor e.g. one or more conductors going on the outside or penetrating the water drainage means in order to connect to the ring. In a further embodiment, the drainage means is made in metal with a good electric conductivity and may thus be used as a connection between the ring and the down conductor.

In a further embodiment the coherent ring is the sidewall of the water drainage means or is a ring of metal positioned directly on the front surface of the nacelle e.g. in the situation in which a wind turbine does not include water drainage means. The ring of metal may also be positioned on the nacelle inside the perimeter of the water drainage means.

In an even further embodiment the coherent ring is either positioned on the inside or outside surface of the water drainage means. The contact means is consequently moved in order to attack the coherent ring from above or below instead of horizontally.

It shall be emphasized that the water drainage means may be replaced by another edge or a similar figure projecting from the front surface of the nacelle e.g. a figure with the sole purpose of establishing contact between the stationary and rotating parts of the lightning protection system.

Further, it is illustrated that the wind turbine blade comprises a ring surrounding the root of the blade and establishing a contact surface 18. The ring is connected to the lightning down conductor 9 inside the wind turbine blade e.g. with one or more metal rods going through the blade. The ring is preferably made in a metal with a good electric conductivity and may preferably surround the wind turbine blade fully. However, less than a fully surrounding ring is also possible e.g. halfway around the blade.

Even further, the ring is preferably mounted on the surface of the wind turbine after the manufacturing of the blade but may also be partly or fully integrated into the surface of the wind turbine blade. The integration may be performed after the manufacturing of the blade by grinding a groove into the surface or at manufacturing by establishing the groove as a part of the manufacturing process.

The metal ring establishes a contact surface on the root of the wind turbine above the pitching mechanism of the wind turbine blade and perpendicular to the longitudinal direction of the blade.

FIG. 3a only illustrates the position of one lightning connection means and one blade. However, it shall be emphasized that under normal condition every wind turbine blade of a wind turbine will be equipped with its own lightning connection means 15. For example a three-bladed wind turbine will comprise three lightning connection means in order to protect all the blades. Each of the lightning connection means connects a rotating lightning part of the lightning protection system with the common stationary lightning part.

FIG. 3b closer illustrates the position of the lightning connection means 15 in relation to the contact surface 18 on the wind turbine blade and the contact surface 17 on the sidewall of the water drainage means.

The figure also illustrates the different sections of the lightning connection means 15 including the base support part 22, two contact means 19 and the flexible links between the base support part and the two contact means. The flexible links ensure that the two contact means actively are forced against the contact surface 18 on the wind turbine blade and the contact surface 17 on the sidewall, respectively. The two contact means 19 and the two contact surfaces 17, 18 establish two contact areas 20. The first of the contact areas 20 ensures a constant contact to the rotating part of the lightning protection system and the other to the stationary part of the lightning protection system. The two contact means are connected by a dedicated electric connection 30 and thus ensuring that the rotating and stationary part of the lightning protection system are coupled together.

FIG. 4 illustrates a preferred embodiment of the lightning connection means 15 according to the invention. The different sections of the lightning connection means are illustrated in details including the base support part 22, the contact means 19a, 19b and the flexible links 26, 27.

The base support part 22 comprises a support plate 31 mounted with two bolts 23 to the flange of the wind turbine blade and the wind turbine hub (as illustrated in FIGS. 3a and 3b). The support plate further carries the first and second connection bracket 24, 25 in which the first in this embodiment includes a sideways displacement section. The brackets are directed in an upward direction toward the wind turbine blade and the nacelle, respectively, and thus form the fixed base portion of a V shape. The brackets are each connected to a flexible link with a number of bolts wherein the links form the rest (and especially the flexible part) of the V shape.

The first and second flexible link 26, 27 are preferably made as boards in a composite material e.g. glass fiber. The boards comprise a length, width and thickness which allow the board to bend quite significantly when exposed to a force at one end but without breaking. Further, the characteristics of the boards are such that the boards will respond with a significant counter-pressure at the end and return to the original positions of rest when the forces are removed.

In a preferred embodiment the board comprises a quadrangular shape with a length between 200 and 500 millimeters such as 300 millimeters, a width between 50 and 300 millimeters such as 80 millimeters and a thickness between 3 and 10 millimeters such as 5 millimeters. The length normally depends on the size of the wind turbine. The width and thickness of the board are normally controlled by the length e.g. a longer board means also means a thicker board in order to establish the correct and necessary flexibility.

The contact means 19a, 19b are mounted on the side of the first and second flexible link 26, 27, respectively, at the free end of the links. The contact means are mounted on opposite sides of the links ensuring that the contact means are facing opposite directions. The contact means are mounted pivotally on the boards by positioning the contact means in U shaped brackets with bolts in adjusting slots. By pivoting the contact means it is possible to alter the position of the contact area 20a, 20b in the up/down direction and thus adapt the contact means 19a, 19b to the contact surface 18 on the wind turbine blade or the contact surface 17 on the sidewall.

Each of the contact means 19a, 19b also comprises a retaining bolt for the dedicated electric connection 30 allowing the electric connection to be established and retained between the two contact means. The electric connection 30 is made in a flexible material with a length corresponding to the distance between the two contact means at their rest position. If the lightning connection means 15 is exposed to forces the flexible links will bend resulting in a more sagging dedicated electric connection 30.

FIG. 5 illustrates more schematically the contact areas of the lightning connection means sliding on the coherent ring of the stationary means of the wind turbine.

The figure illustrates the situation of a rotating three-bladed wind turbine rotor with three lightning connection means including contact area 20b. As each lightning connection means is mounted on the hub and the main shaft 14 they will rotate with the main shaft as the center of the rotation. Further, the contact means is positioned in a distance from the center corresponding to the diameter of the ring. The contact means will thus perform a circular rotation facing the coherent ring while being continuously forced against the surface of the coherent ring.

FIG. 6 illustrates the contact surface of the rotating means of the wind turbine as a metal ring (as explained in connection with FIG. 3a). The contact surface surrounds the root of the blade above the pitching mechanism and will as a result rotate with the pitching of the blade.

The figure illustrates the contact surface of a pitch-controlled wind turbine blade connecting with the contact area 20a of a lightning connection means which faces the blade. The contact area 20a is continuously forced against the contact surface and slides on the surface when the blade is pitched to one or the other side.

The lightning connection means will not rotate in relation to the matching blade during rotation as the lightning connection means are mounted on the flanges of the hub together with the blades.

FIG. 7a illustrates the contact means 19a facing the contact surface of the wind turbine blade.

Figure 1:
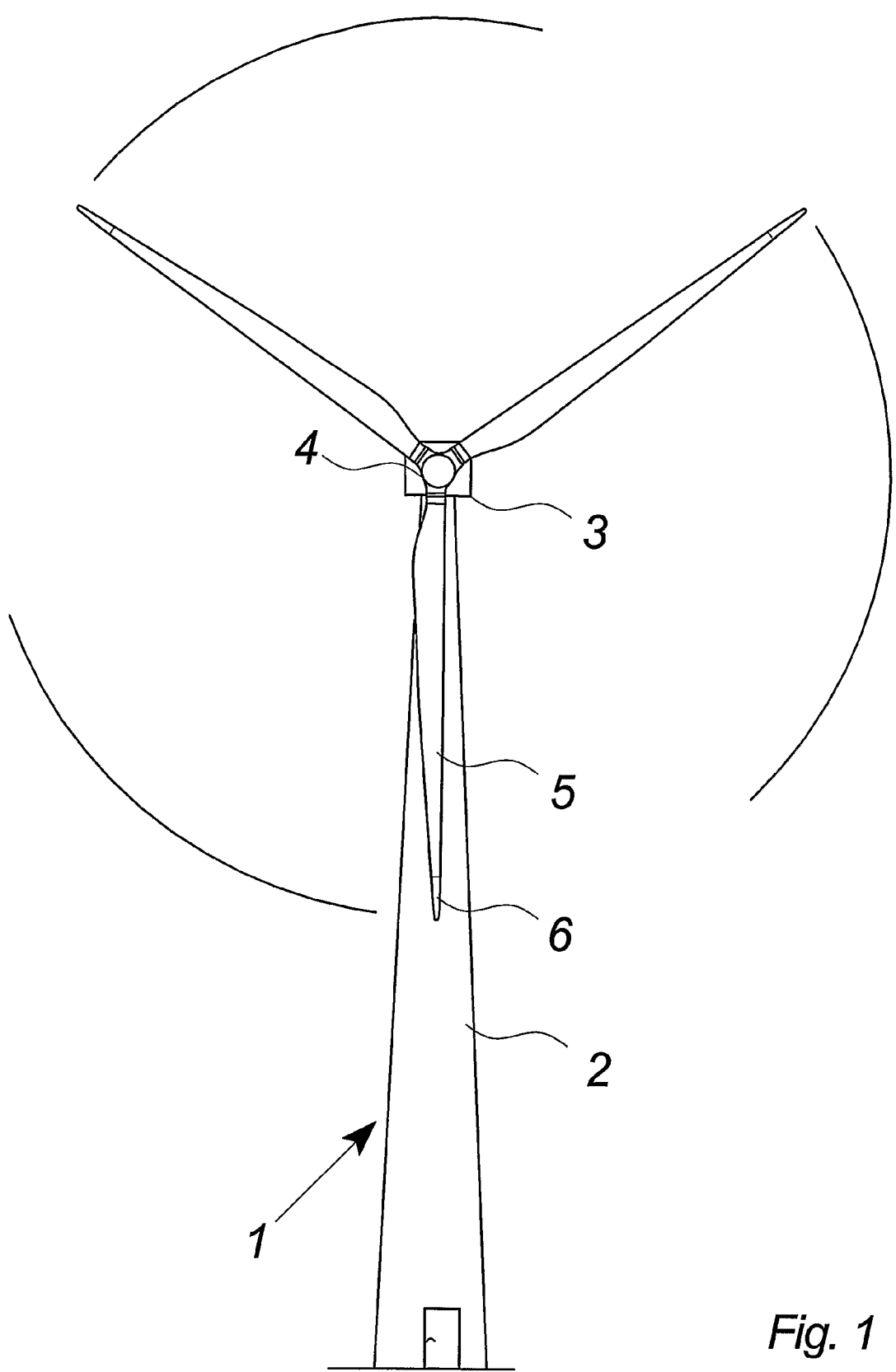
Figures 2A, 2B:
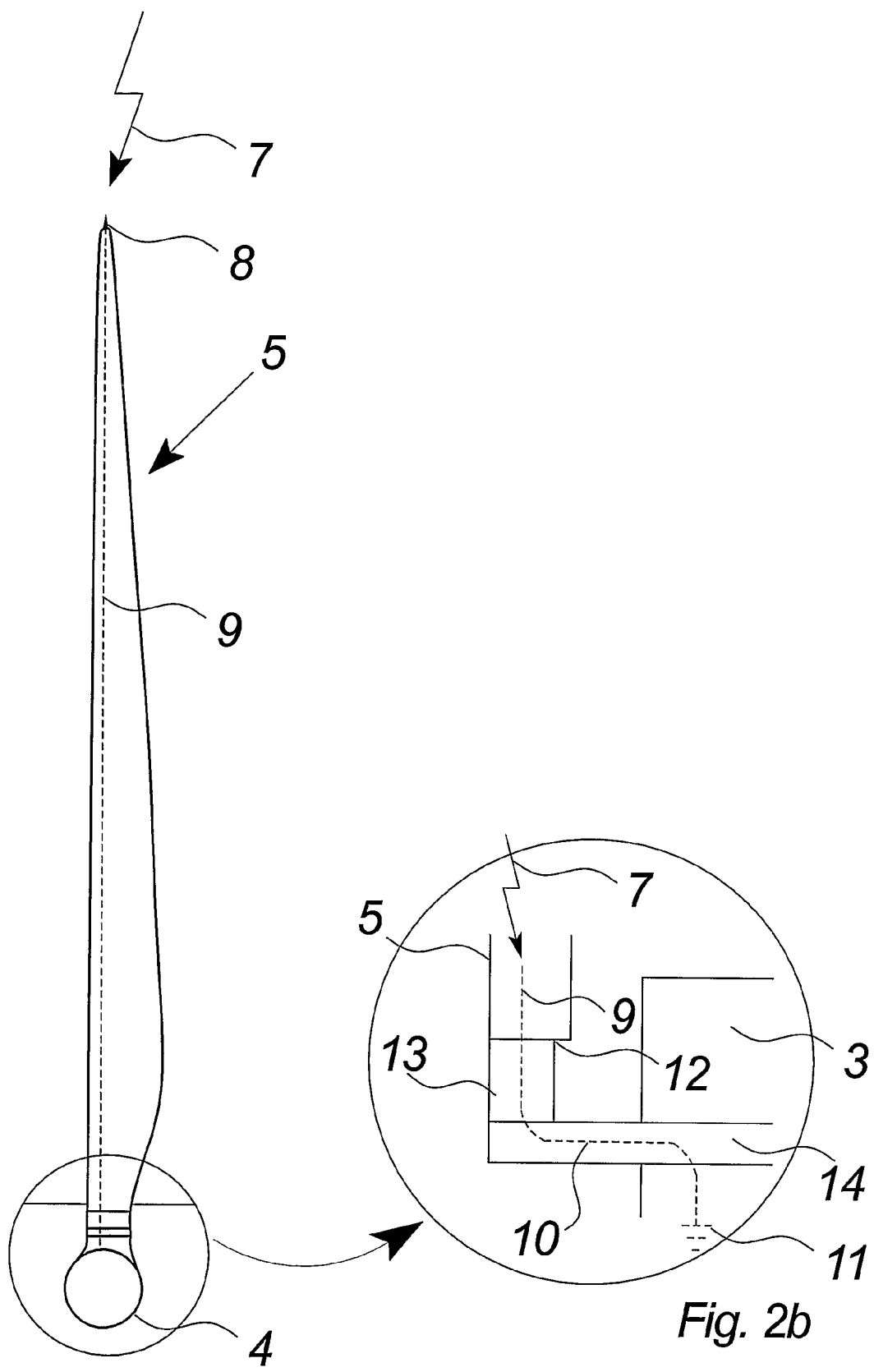
Figure 3B:
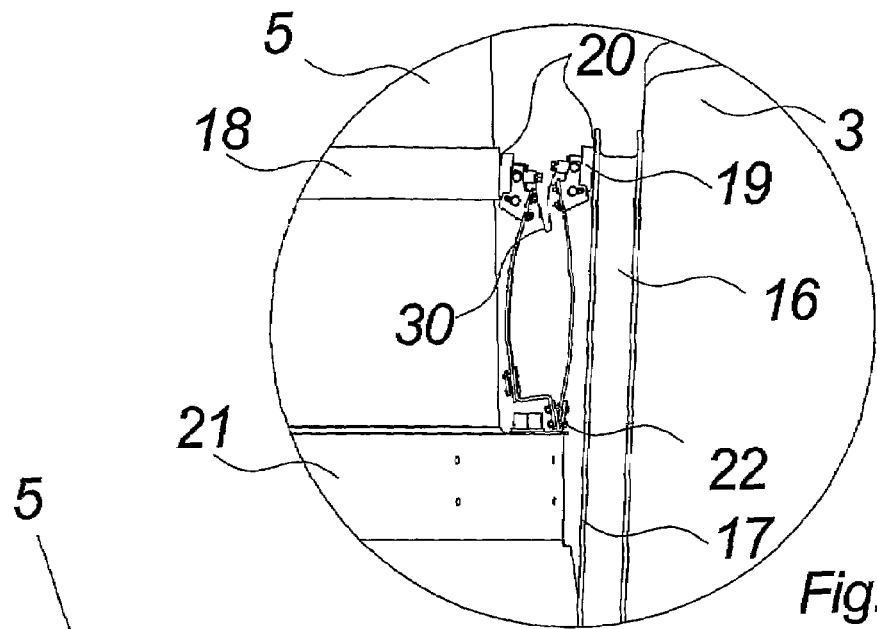
Figure 3A:
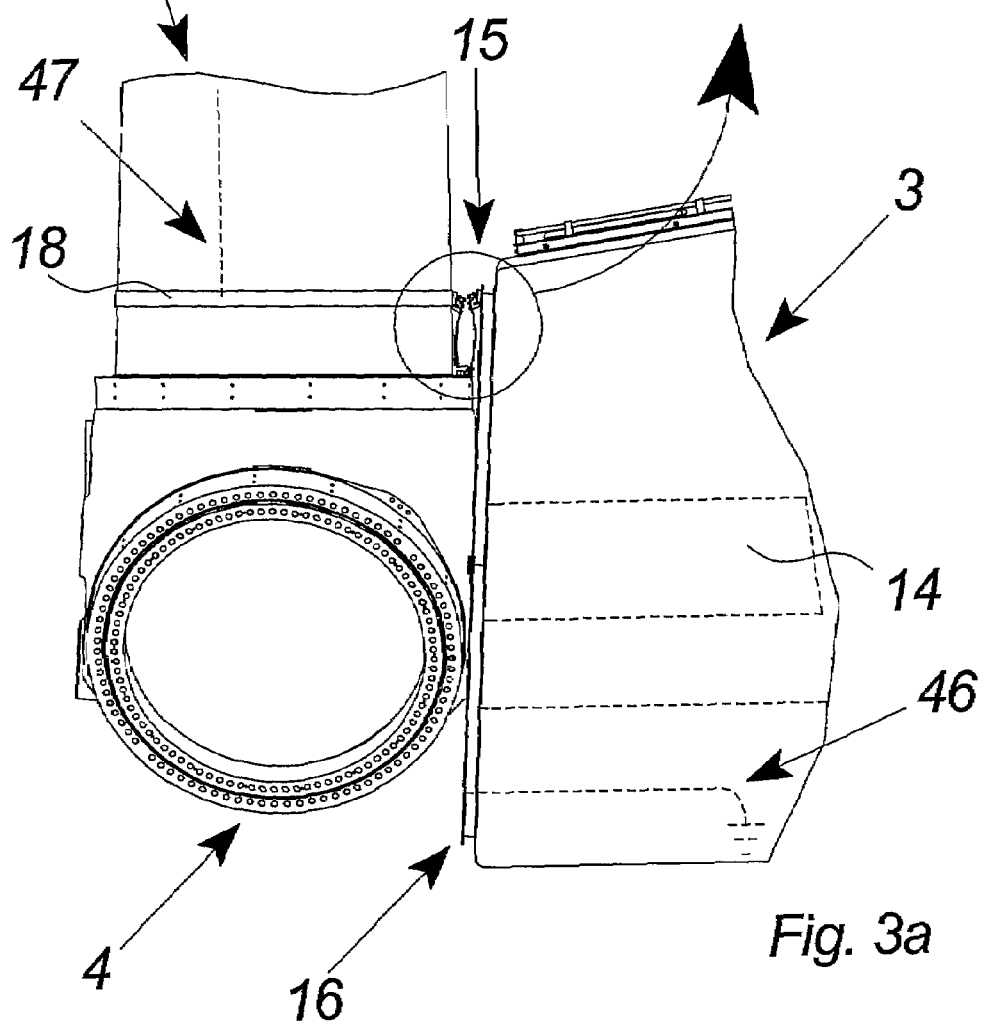
Figure 4:
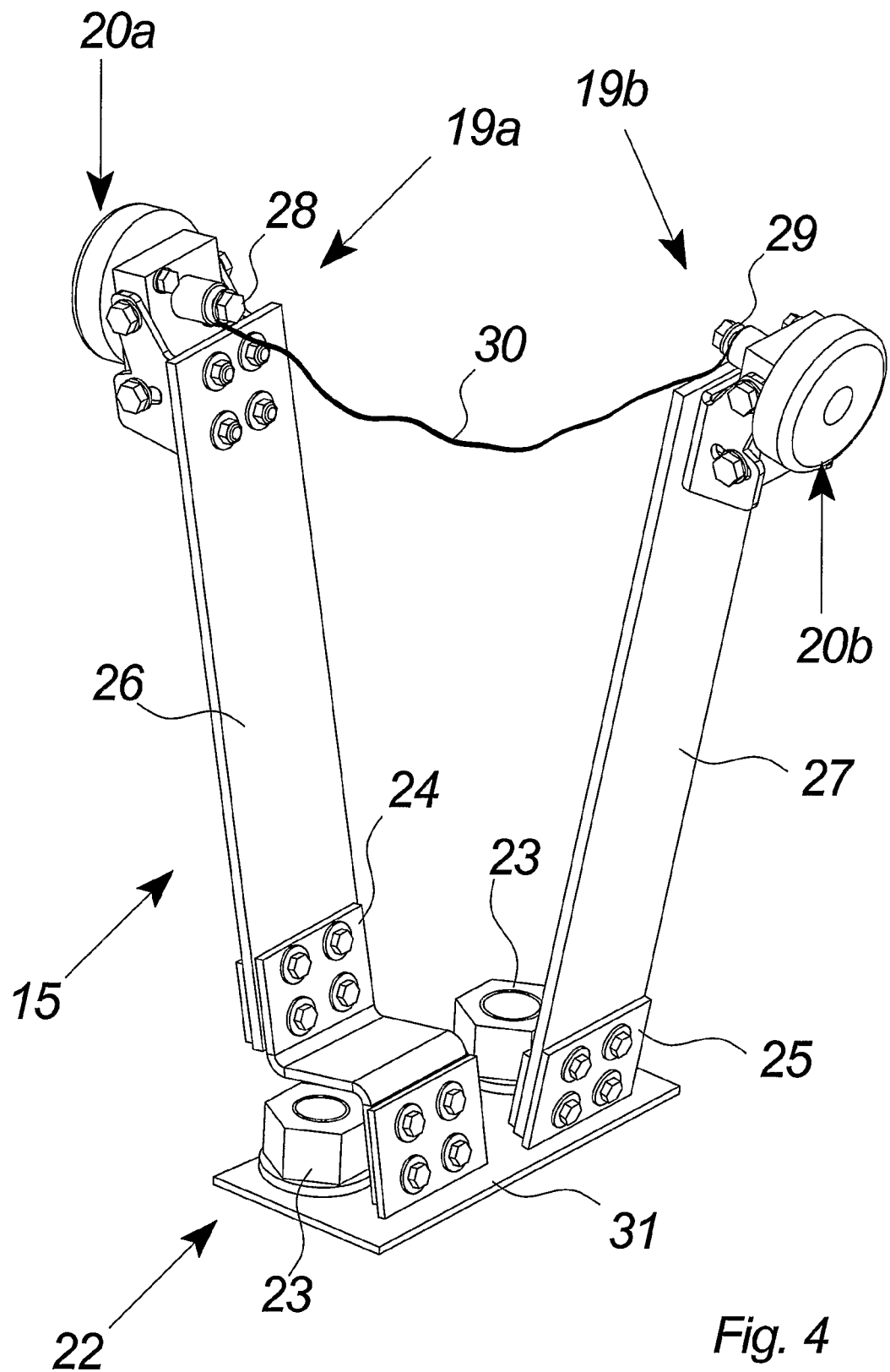
Figure 5:
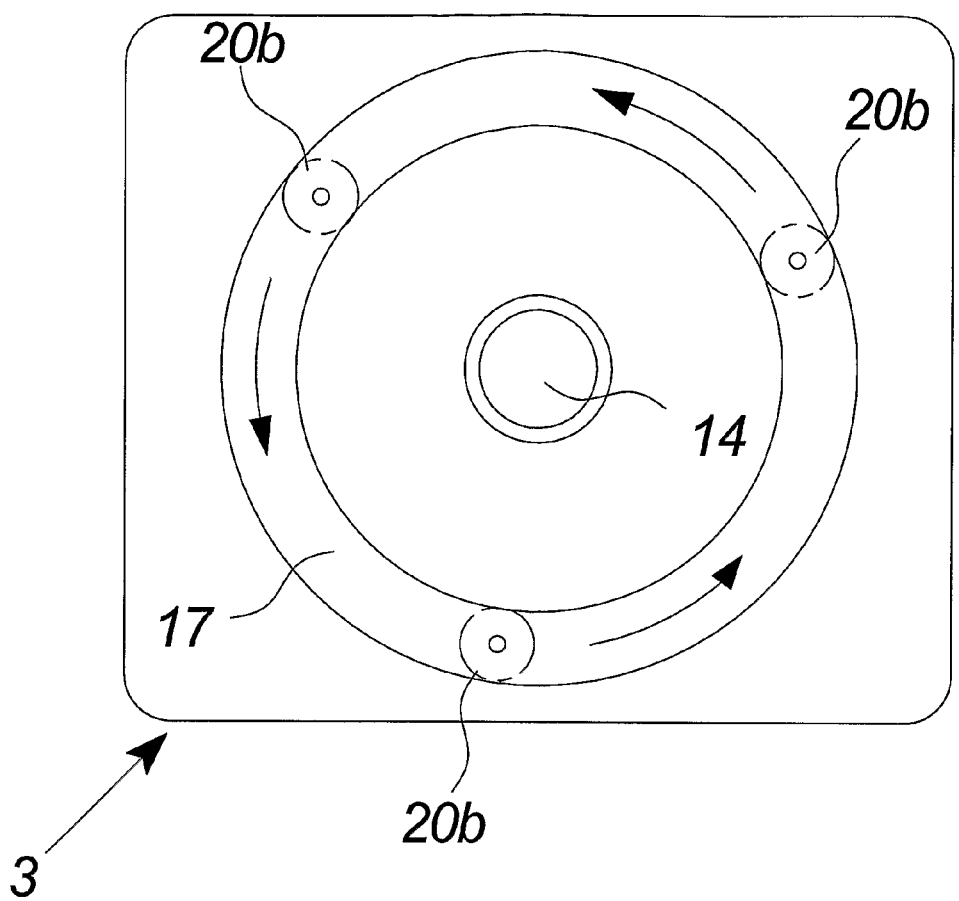
Figure 6:
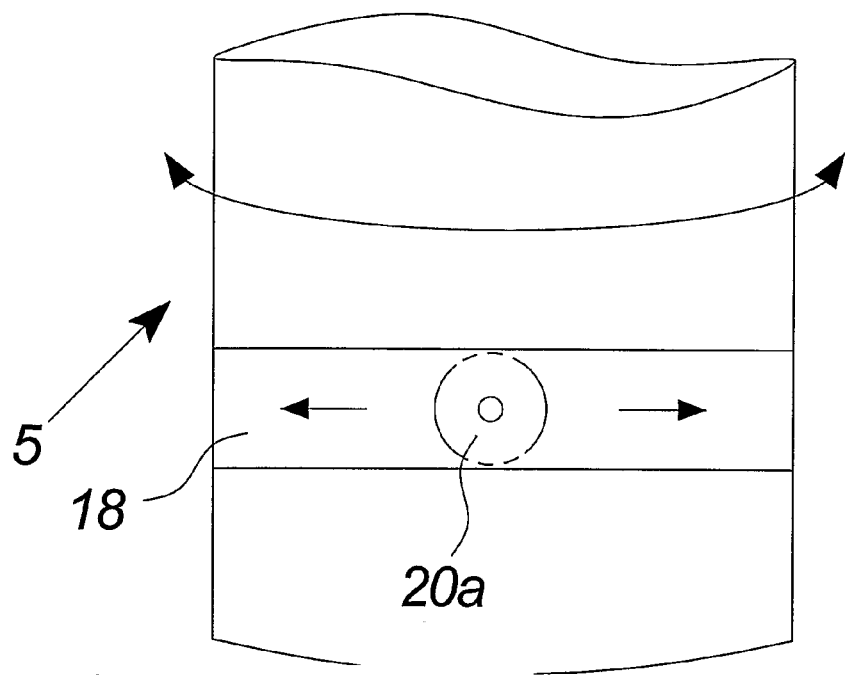

The contact means 19a comprises a connection to the flexible link 26 through the U shaped bracket 37. The bracket and the flexible link are bolted together with four bolts 36 penetrating the central part of the bracket and the top of the link before being terminated with nuts. The two opposite bracket sidewalls partly surround the frame unit 40 and are bolted to the unit with a bolt 39 through a hole in each bracket side. The bracket sidewalls further comprise substantially horizontal slots 38 below the holes. Further bolts are entered through the slots and screwed into the frame unit. The bracket connection allows the contact means 19a and especially the contact area 20a to be moved pivotally within the limits of the slots.

The frame unit is also the base for the sliding pad 41 of the contact area 20a and the means retaining the electric connection 30 including the retaining bolt 28 (as will be explained further in connection with FIG. 8).

The bracket should be made in a durable material e.g. glass fiber as the flexible link or in metal e.g. steel. The material must be prepared for significant strains such as high mechanical forces and temperatures.

Figures 7A, 7B:
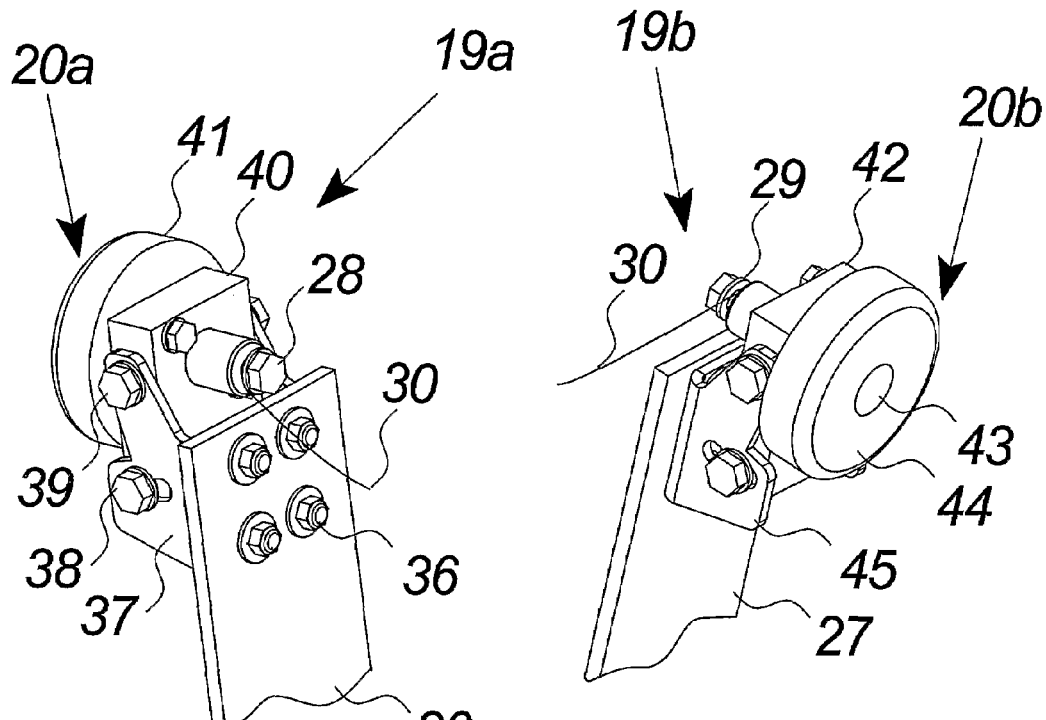
FIGS. 7a to 7c illustrate different parts of the lightning connection means according to the invention.

FIG. 7b illustrates the contact means 19b facing the contact surface of the coherent ring of the stationary means in the wind turbine. The construction of the contact means 19b preferably corresponds to the construction of the contact means 19a.

The figure further illustrates the integration of the rod 43 in the center of the pad 44 in the contact area 20b.

Figure 7C:
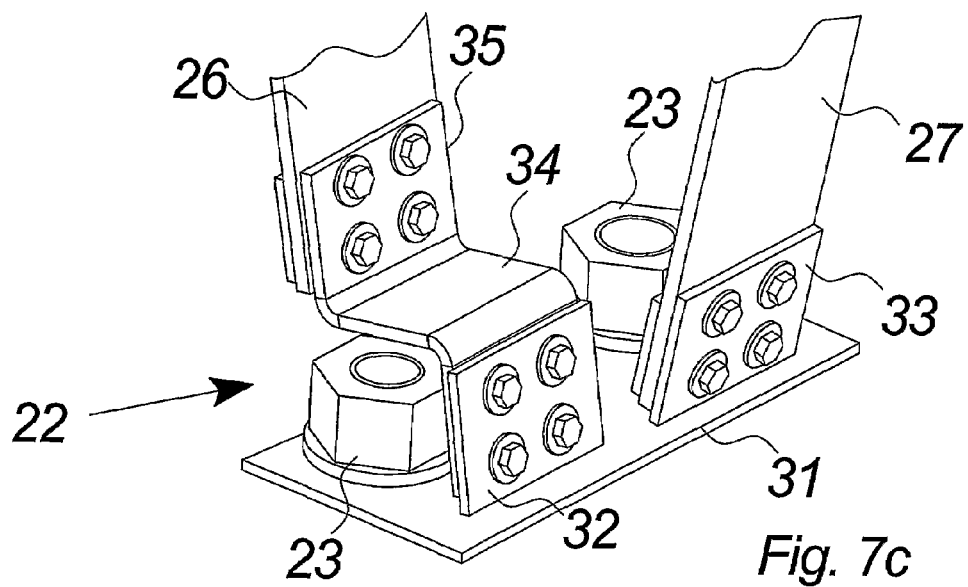

FIG. 7c illustrates the base support part 22 in more details including the brackets forming a fixed base for the rest of the lightning connection means.

The brackets 33, 35 are connected to the respective flexible links by quadrangular plates 5 positioned on opposite sides of each bottom end of the link or the displacement section 34. The link and the plates are penetrated by four holes in order to be connected by bolts and nuts.

The brackets 32, 33, 35 and the support plate 31 are preferably made in a durable metal such as steel. The brackets may hereby be welded to the support plate 31 in a preferred angle in relation to the support plate. The displacement section of the one bracket may also be made in metal such as steel but may also be made in a flexible material such as glass fiber (and thus making it a part of the flexible link).

Figure 8:
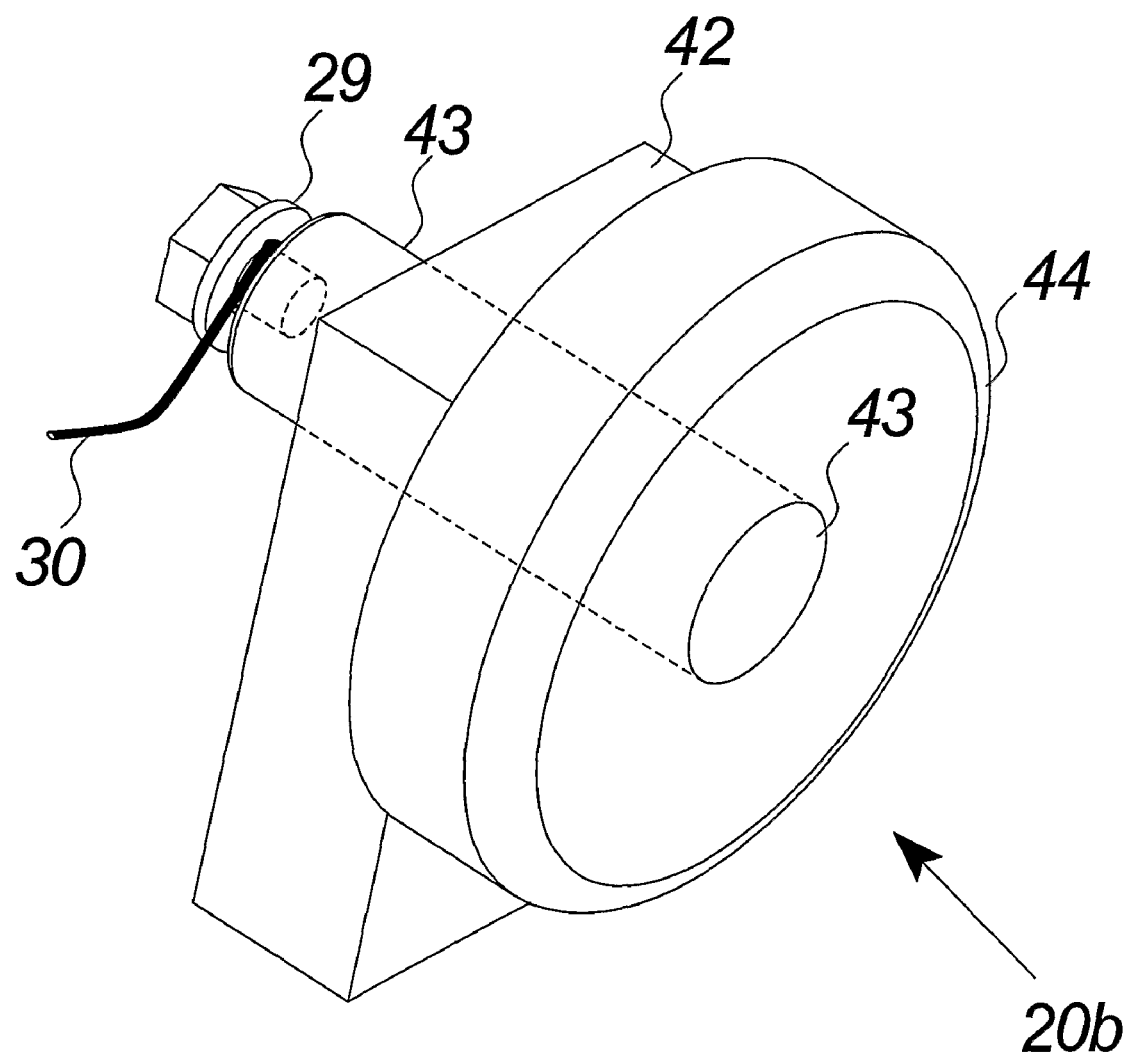

FIG. 8 illustrates the contact means of the lightning connection means with a preferred embodiment of the contact area 20b.

The contact means comprises a frame unit 42 working as a common basis for the different features of the contact means. The frame unit is connected to the flexible link (illustrated in FIG. 7b) and to the front of the contact means. The front includes the contact rod 43 which establishes a base for retaining the electric connection 30. The retaining is established by screwing the bolt 29 into a hole at the bottom end of the contact rod 43. The bolt squeezes the electric connection 30 against the bottom of the contact rod 43.

The dedicated electric connection 30 is in direct contact with the contact area 20b as the rod extending through the frame unit and pad 44. The surface of the rod 43 and the pad 44 jointly establish the contact area 20b in which the contact area preferably is flat with a smooth transition between the two. The rod preferably makes the electric contact to the contact surface of the rotating or the stationary part of the lightning protection system and the pad 44 ensures a low friction slide on the contact surface. The area of the pad will normally be significantly larger than the area of the rod and thus ensures a common low friction slide on the surface.

The rod is preferably made in an electric conductive material such as copper, aluminum or a metal alloy based on one of the two e.g. bronze. Further examples of suitable rod materials are metal graphites in which the alloy has material contents of 15-95% copper, copper alloys or silver. Also electro graphites are usable as rod materials.

The pad is preferably made in a low friction material such as nylon, acetal or Vesconite e.g. glass filled nylon in order to enhance the durability and the mechanical properties.

The contact surface of the stationary and the rotating means are preferably made in stainless steel such as a stainless steel band around the root of the wind turbine blade or the coherent ring in sections of stainless steel.

Figure 9:
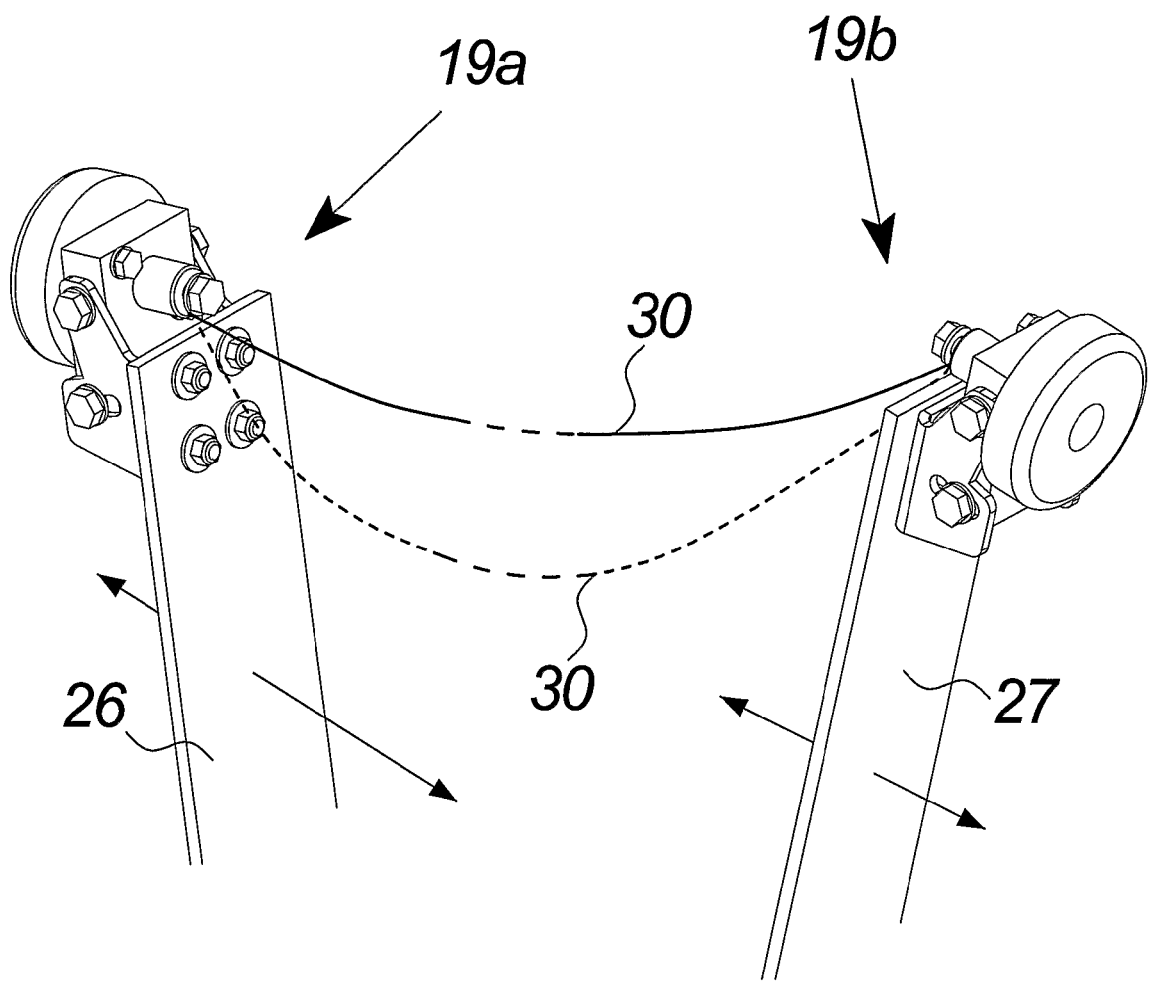

FIG. 9 illustrates the dedicated connection between the contact means of the lightning connection means.

The dedicated connection establishes contact between the two contact means 19a, 19b and especially the contact areas 20a, 20b facing the contact surfaces of the stationary and rotating lightning protection means of the wind turbine. The dedicated connection must be in a flexible material as the contact means continuously adapt to the position of the contact surfaces. The flexibility of the connection is illustrated in the figure by a first situation in which the contact means are far apart and the connection (solid line) is rather stretched out. In the second situation the contact means are forced close together and the connection (dotted line) is sagging.

The connection is preferably made as a flexible metal conductor e.g. a woven copper or aluminum rope or cable such as a tin coated copper cable, of diameters between 50 and 120 $mm^2$.

Figure 10:
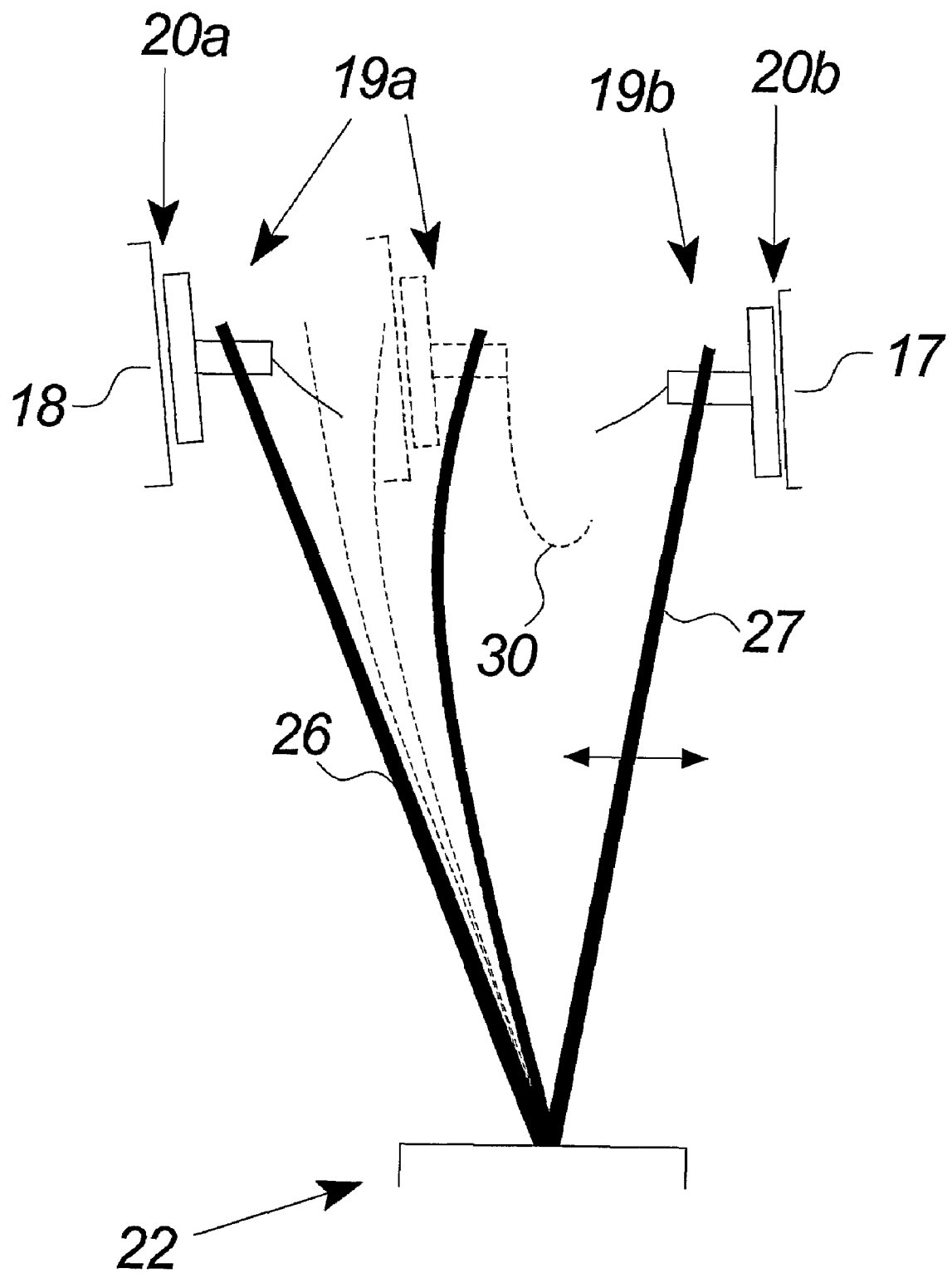

FIG. 10 illustrates schematically the continuous functionality of the lightning connection means.

The lightning connection means is in the first situation (solid lines) forced against the contact surfaces 17, 18 with little strain on the flexible links 26, 27 and the connection is stretched out. The situation may be regarded as an example of the outer limit of the contact surface positions.

The contact surface 18 is in the second situation (dotted lines) moved closer to the other surface and the contact means 19a is thus forced back in order to continue the contact to the surface. The flexible link is bending due to the force applied on the contact means 19a and the fixed position of the base support part 22. The contact means 19a also performs a pivotal movement (in the adjustable bracket) as it is forced back. The contact means may remain in good electric contact with the contact surface 18 by performing the adjustment. The adjustment is performed automatically as the applied forces to the contact means from the contact surface or the flexible link always will press the contact means toward the contact surface. The largest surface area of the contact means will thus be forced against the contact surface and preferably the two surfaces are parallel when forced against each other.

Figure 11:
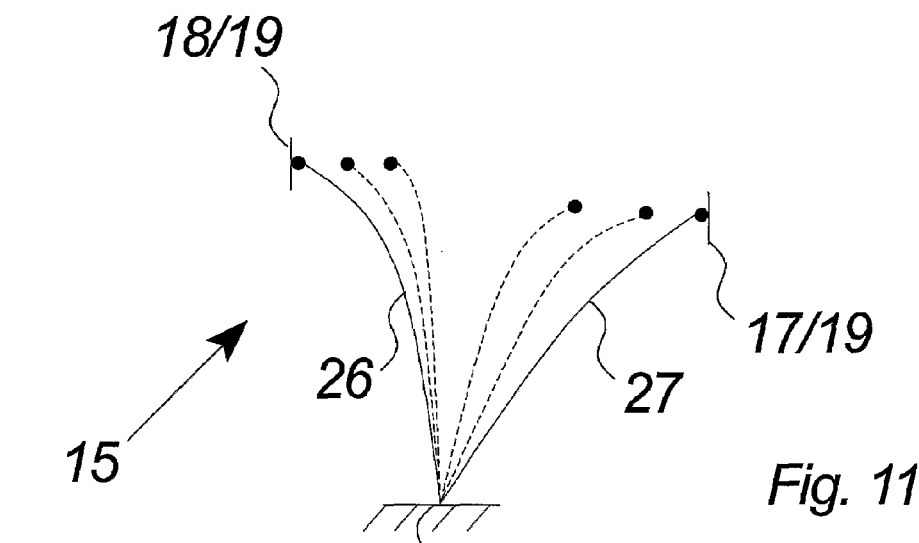
Figure 12:
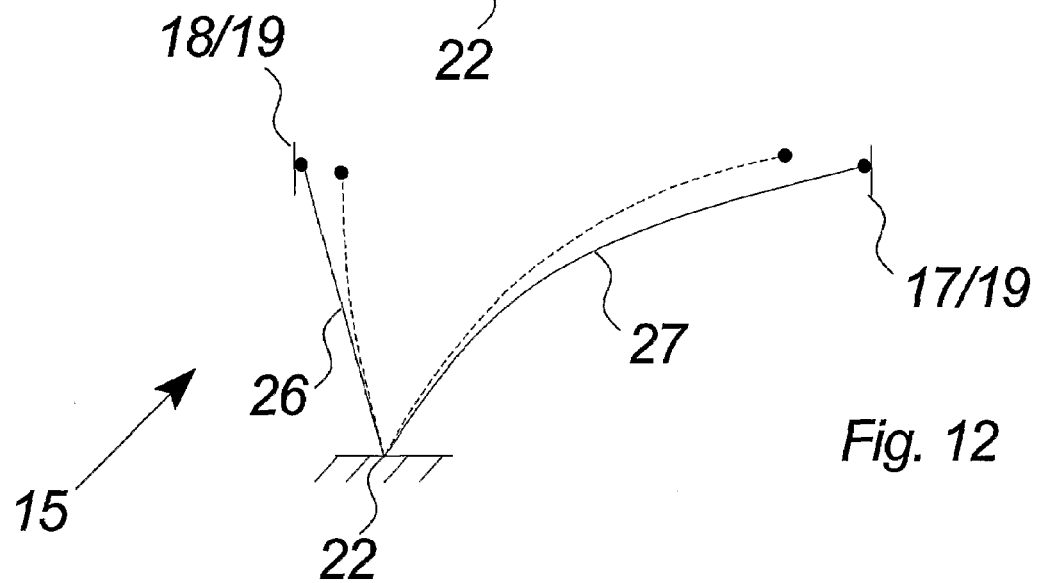
Figure 13:
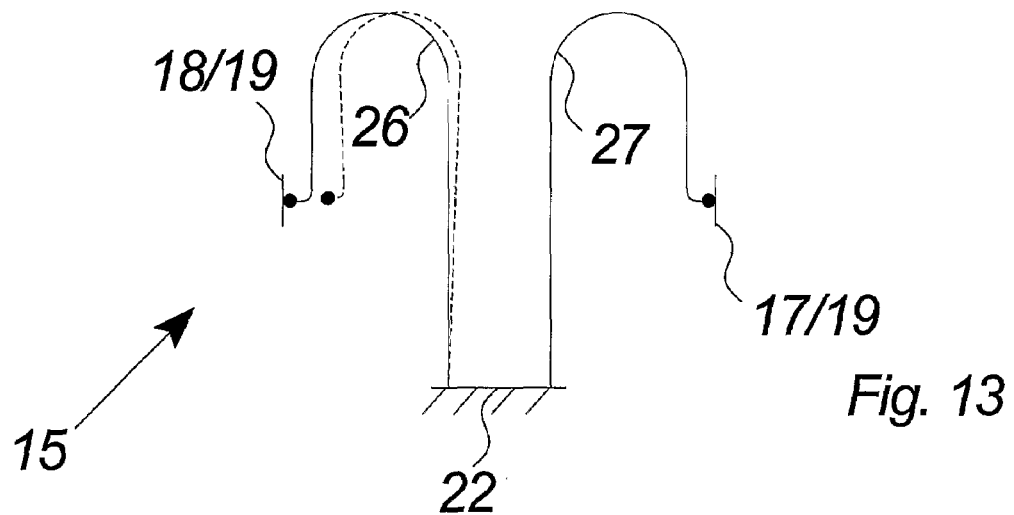

FIGS. 11 to 13 illustrate schematically further embodiments of the lightning connection means.

FIG. 11 illustrates an embodiment of the lightning connection means 15 which is similar to the embodiment of FIG. 10. However, the force transferring means 26, 27 of the present embodiment bend backwards in a more circular manner instead of the linear bending backwards of the previous figure. The embodiment illustrates two force transferring means 26, 27 with some differences in length and shape. The two force transferring means may thus bend differently (as illustrated with the dotted lines).

FIG. 12 illustrates a further embodiment of the lightning connection means 15 in which the two force transferring means 26, 27 are shown as one being much longer than the other. The longer one will hereby have a more flexible nature with the possibility of a longer travel distance for the contact means (as illustrated with the dotted lines).

FIG. 13 illustrates a further embodiment of the lightning connection means 15 in which the two force transferring means 26, 27 are shown as linear sections that separately extend from the base part 22. At some distance from the base part the linear sections each change to circular sections extending in opposite directions and ending in the contact means 19. The circular sections may be changed in form and size such as in diameter when force is applied to the contact means (as illustrated with the dotted lines). Further, the linear sections may be bent for- or backward and thus changing the positions of the circular sections and the contact means (as also illustrated with the dotted lines).

Figure 14:
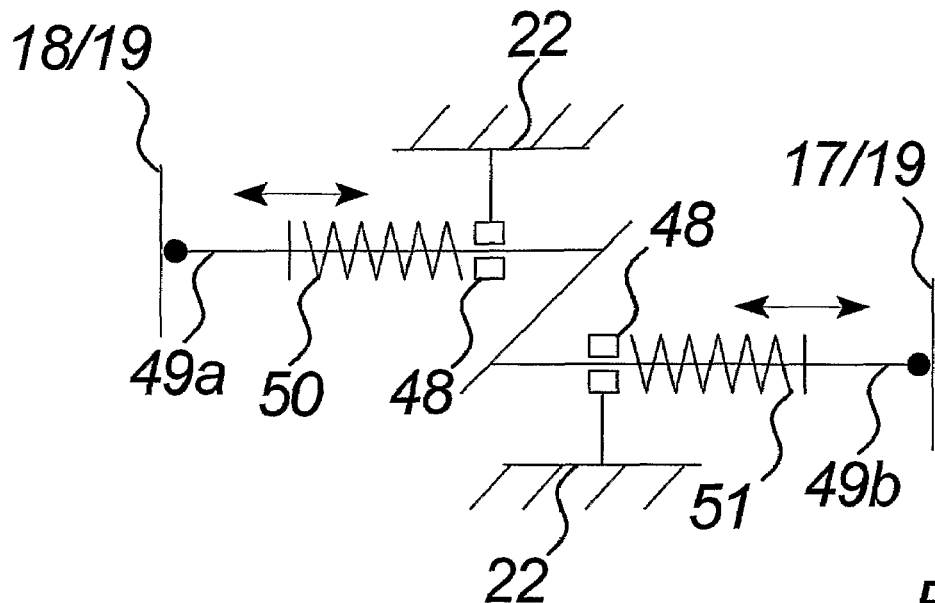
Figure 15:
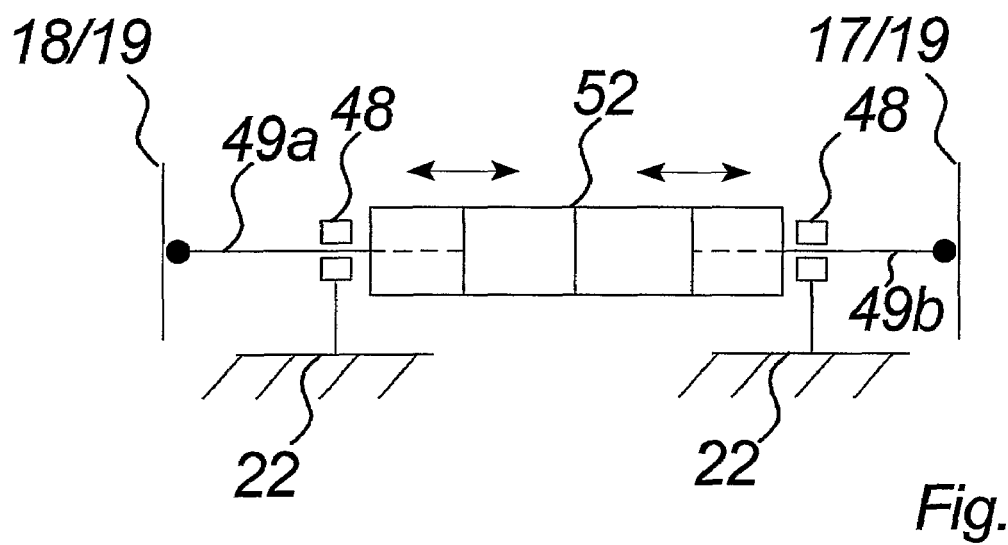

FIGS. 14 and 15 illustrate schematically even further embodiments of the lightning connection means.

FIG. 14 illustrates an embodiment of the lightning connection means in which two piston means 49a, 49b with springs 50, 51 are used as force transferring means. The springs force against a common wall and the rods of the two pistons which hold the contact means 19. The rods travel in between guidance means 48 that are connected to the base support plate 22. The springs are preferably helical springs surrounding the rods.

FIG. 15 illustrates a further embodiment of the lightning connection means in which two gas filled cylinders are positioned back to back. The cylinders act as force transferring means forcing the pistons with contact means against the contact surfaces 17, 18. The gas filled cylinders are preferably a closed system in which the pistons 49a, 49b compress or expand the gas by the traveled distance. The gas may be air establishing a pneumatic system. The pistons travel in between guidance means 48 that are connected to the base support plate 22.

The spring actuated pistons and gas filled cylinders of FIGS. 14 and 15 may be seen as part of the flexible force transferring means. The normal flexible connection between the base part 22 and the contact means 19a, 19b may thus be replaced e.g. with less bending boards as the pistons or cylinders establish the necessary flexibility.

FIGS. 16 and 17 illustrate schematically further embodiments of the contact means of the lightning connection means.

FIG. 16 illustrates an embodiment of the contact means 56 involving a wheel 55 surrounded by two circular contact devices 53a, 53b. The wheel is preferably made in a flexible and high friction material such as rubber—solid or as an inflated tire. The circular contact devices are made in a metal with low electrical resistance and are connected to another contact means with the dedicated electric connection 30 (not illustrated on the figure). The connection to the electric connection 30 may be established directly to the circular contact means or through the shaft 54 of the circular contact means and the wheel.

The contact means 56 may also comprise just one wheel and one circular contact means or several wheels together with one or more circular contact means. Redundancy is established with the use of several wheels and circular contact means.

FIG. 17 illustrates a contact means in an embodiment involving metal bearing balls in a recess of the contact ring means 57. The recess is illustrated as one recess forming a continuous circle. The recess may be established by using two parts in establishing the contact ring means 57 in which one part establishes the outer section of the recess 57a and the other part the inner section 57b. The bottom of the recess may be filled with a flexible material such as a rubber layer in order to allow the bearing balls to adapt to pressure from the force transferring means. Further, the bearing balls may be integrated in a bearing ring allowing the balls to rotate but not move within the recess.

The recess may also be replaced by a number of limited recesses in different positions at the surface of the contact ring means 57 e.g. recesses being symmetrically positioned in order to create a continuous and stable contact to the contact surface.

The bearing balls enhance the sliding over the contact surface and the contact ring means 57 preferably establish the electric contact to the contact surface. Ceramic bearing balls such as bearing balls in silicon nitride or a similar ceramic material may replace the conventional metallic bearing balls. Ceramic bearing balls are extremely corrosion and abrasion resistant, and are not affected if marginally lubricated. This guarantees accurate operation even under extreme wear conditions. Other examples of bearing ball material are Alumina Oxide or Zirconia.

FIG. 18 illustrates an embodiment of the lightning connection means including the contact means of FIGS. 16 and 17.

The figure illustrates how the contact means 59 involving metal bearing balls in a recess is mounted directly to the force transferring means 26. Further, it is illustrated how the contact means 59 including the bearing balls is forced against the contact surface 18 establishing an electric contact between the surface and the electric connection 30.

The figure illustrates how the circular contact means 56 is mounted on a strap forming a more or less flexible connection acting as a force transferring means 60 to the link 61 linking the contact means and strap to the base part 22. The force transferring means 60 may be used as the only force transferring means for the circular contact means 56 in which case the link 61 is a substantially inflexible link to the base part. Further, force transferring means 60 and the link 61 may together establish the force transferring means in which case both are part in the flexible link to the base part 22. Even further, the strap may be substantially inflexible and the link 61 being the sole force transferring means ensuring that the circular contact means 56 is forced against the contact surface 17.

The circular contact means 56 and the force transferring means 60 is illustrated as mounted in the direction of the movement of the lightning connection means allowing the circular contact means 56 to follow the contact surface 17 (as illustrated with the arrow).

It shall be emphasized that any combination of types of contact means may be used in the lightning connection means.

Figure 19A:
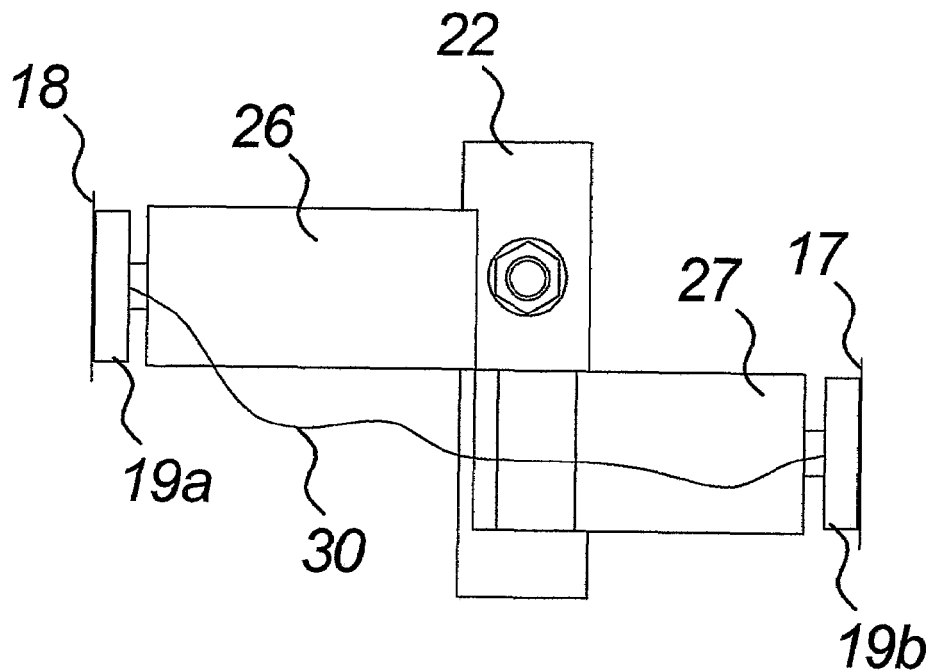
Figure 19B:
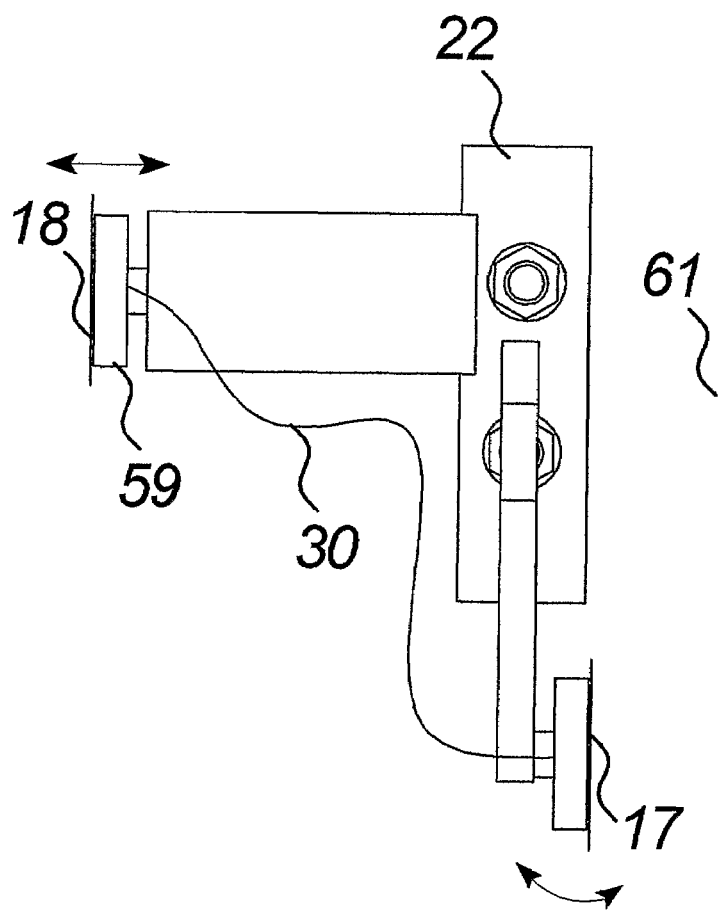

FIGS. 19a and 19b illustrate further embodiments of the force transferring means in the lightning connection means.

FIG. 19a illustrates the lightning connection means with force transferring means substantially being in the same geometric plane. The contact means are either moved toward or away from each other by the force transferring means in the substantially same geometric plane and may pass each other closely.

The base part 22 of the lightning connection means may be seen as the fixed position in relation to which the force transferring means 27 are rotated. The situation of FIG. 19a in which the force transferring means 26, 27 both extend perpendicular or upright from the base part may be seen as the standard extension.

One or both of the force transferring means 26, 27 may be rotated by any angle desired in relation to the standard extension e.g. the first force transferring means 26 being rotated 80 degrees to one side and the second force transferring means 27 being rotated 80 degrees to the other side. Hereby, a mutual angle between the first and second force transferring means 26, 27 of 160 degrees is established.

FIG. 19b illustrates an embodiment in which the lightning connection means with force transferring means are substantially in perpendicular geometric planes. The second force transferring means 27 is rotated 90 degrees in relation to the previous position illustrated in FIG. 19a.

The invention has been exemplified above with reference to specific examples. However, it should be understood that the invention is not limited to the particular examples described above but may e.g. be used in connection with a wide variety of different wind turbine types in which the rotor blades are more passively controlled types involving stall or active stall.

Further, it should be understood that especially the flexible link between the support and the contact means may be designed in a multitude of varieties within the scope of the invention as specified in the claims.

Even further, it shall be emphasized that the metal rings of the stationary and rotating means may be less than coherent e.g. missing a section. The metal ring of the stationary means may for example be without the lower third part. Each lightning connection means will then be without connection to the ground potential in the lower third part of a rotation. The lower third part of a rotation is the part in which a lightning stroke is less likely to hit the blade in question (instead of the other blade(s) having a higher position at the moment and connected to the ground potential).

The metal ring of the rotating means may be diminished to half the normal size. The blade of the rotating means may thus only be pitched a maximum of 90 degrees forward and backward in order to remain in contact with the lightning connection means.

Finally, it shall be emphasized that the lightning connection means not necessarily needs to be V shaped. One of the "legs" in the V shape may be more or less vertical in which the degree of verticalness defines the strength in which the contact means may be forced against the contact surface—more vertical leg resulting in less force. However, the legs should form a mutual angle in order to uphold a change in the position of the contact surface.

LIST

1. Wind turbine
2. Wind turbine tower
3. Wind turbine nacelle
4. Wind turbine hub
5. Wind turbine rotor blade(s)
6. Wind turbine tip
7. Lightning stroke
8. Lightning receptor
9. Lightning down conductor
10. Electric current path
11. Electric ground potential
12. Pitching area of the wind turbine blade
13. Blade pitching mechanism
14. Main shaft
15. Lightning connection means
16. Water drainage means
17. Contact surface of the stationary means
18. Contact surface of the rotating means
19, 19a, 19b. Contact means against the rotating and/or stationary means
20, 20a, 20b. Contact area at the surface of the rotating and stationary means
21. Mounting area/flange of the wind turbine blade
22. Base support part of the lightning connection means
23. Mounting bolts connecting the wind turbine blade, the wind turbine hub and the main shaft
24. First connection bracket including a displacement section 25. Second connection bracket
26. First force transferring means between the base part and the contact means
27. Second force transferring means between the mounting part and the contact means
28. First retaining bolt for dedicated electric connection
29. Second retaining bolt for dedicated electric connection
30. Dedicated electric connection between the contact means
31. Support plate
32. Bracket section against the support plate
33. Second connection bracket (=25)
34. Displacement section of bracket
35. Bracket section against the flexible link between the mounting part and the contact means
36. Retaining bolts
37. First adjustable bracket
38. Slot with bolt allowing angle adjustment
39. Bolt allowing a pivoting adjustment
40. First frame unit
41. First pad made in low friction material
42. Second frame unit
43. Second rod in electric conductive material
44. Second pad made in low friction material
45. Second adjustable bracket
46. Stationary lightning protection means
47. Rotating lightning protection means
48. First and second guidance means connected with the support plate
49a, 49b. Piston means
50. First helical spring for actuating the piston means
51. Second helical spring for actuating the piston means
52. Linear gas filled cylinder or cylinders with piston
53a, 53b. Circular contact devices
54. Shaft
55. Wheel with a flexible and high friction surface
56. Circular contact means
57, 57a, 57b. Contact recess means
58. Bearing balls
59. Contact means including bearing balls
60. Force transferring means between the link to the mounting part and the contact means
61. Link to the base part e.g. a board in a flexible or non-flexible material

The invention claimed is:

1. A wind turbine comprising
stationary means including a nacelle and a tower comprising stationary lightning protection means,
rotating means comprising a rotor including at least one wind turbine blade and shaft means, each of said at least one wind turbine blade comprising rotating lightning protection means,
said stationary and rotating lightning protection means comprising contact surfaces connected by lightning connection means,
said lightning connection means comprising
at least two contact means adapted for connecting said rotating and stationary lightning protection means,
at least one electric conductor establishing a dedicated connection between said at least two contact means, and
force transferring means for said at least two contact means establishing a continuous connection between said at least two contact means and the contact surfaces of said stationary and rotating lightning protection means.

2. The wind turbine according to claim 1, wherein a base support part of said lightning connection means is mounted on the rotating means.

3. The wind turbine according to claim 2, wherein said base support part of said lightning connection means is mounted to a flange of said wind turbine blade.

4. The wind turbine according to claim 3, wherein said base support part is mounted to the flange of said wind turbine blade with use of blade mounting bolts.

5. The wind turbine according to claim 1, wherein each lightning connection means is connected to one wind turbine blade.

6. The wind turbine according to claim 1, wherein a number of said lightning connection means is two in a two bladed wind turbine and three in a three bladed wind turbine.

7. The wind turbine according to claim 1, wherein the contact surface of said stationary lightning protection means is connected to a ground potential.

8. The wind turbine according to claim 1, wherein the contact surface of said stationary lightning protection means is a coherent circular metal plate ring at a front of the nacelle.

9. The wind turbine according to claim 8, wherein the coherent circular metal plate ring is positioned on a front, lower and/or upper side of drainage means of the nacelle.

10. The wind turbine according to claim 1, wherein the contact surface of said rotating lightning protection means is connected to lightning receptor means through lightning down conductor means.

11. The wind turbine according to claim 10, wherein the contact surface of said rotating lightning protection means comprises a metal ring positioned partly or totally around one wind turbine blade above a pitching mechanism.

12. A lightning connection system including lightning connection means for a wind turbine, said system comprising rotating and stationary lightning protection means of said wind turbine, at least two contact means adapted for connecting the rotating and stationary lightning protection means of said wind turbine,
at least one electric conductor establishing a dedicated connection between said at least two contact means, and
force transferring means establishing a continuous connection between said at least two contact means and contact surfaces of said rotating and stationary lightning protection means, wherein said force transferring means are made of an electrically insulating material.

13. The lightning connection system according to claim 12, wherein said at least two contact means form contact areas facing the contact surfaces of said rotating and stationary lightning protection means.

14. The lightning connection system according to claim 12, wherein one of the at least two contact means comprises at least one rod surrounded by a pad in which the surface of the at least one rod and pad mutually form the contact area.

15. The lightning connection system according to claim 14, wherein said at least one rod is made in a material with a high electric conductivity such as copper, aluminium, an alloy hereof, a metal graphite, electro graphite or similar materials.

16. The lightning connection system according to claim 14, wherein said pad is made in a material with a low friction surface such as a polymer material such as Teflon or nylon.

17. The lightning connection system according to claim 12 wherein one of the at least two contact means comprises at least one wheel and at least one circular contact means on a common shaft.

18. The lightning connection system according to claim 17, wherein said at least one wheel is made in a flexible material such as rubber with a diameter preferably slightly larger than said at least one circular contact means.

19. The lightning connection system according to claim 17, wherein said at least one circular contact means is made in a material with a high electric conductivity such as copper, aluminium or an alloy hereof.

20. The lightning connection system according to claim 17, wherein said contact means comprises one wheel surrounded by one circular contact means on each side.

21. The lightning connection system according to claim 12, wherein said contact means comprises a contact area including at least one recess and rotating means such as a number of bearing balls.

22. The lightning connection system according to claim 12 wherein said force transferring means is at least one flexible link between said contact means and a base support part.

23. The lightning connection system according to claim 22, wherein said base support part comprises at least a first and second bracket for holding at least a first and second force transferring means in which said brackets direct said force transferring means in at least two directions.

24. The lightning connection system according to claim 23, wherein said first and second force transferring means mutually establish a V shape with said base support part as the centre and contact means, directed in opposite directions, at each ends of said first and second force transferring means.

25. The lightning connection system according to claim 24, wherein said force transferring means mutually form an angle of at least 40 degrees at the brackets.

26. The lightning connection system according to claim 23, wherein said first and second force transferring means are attached next to each other at the base support part and move in substantially parallel directions.

27. The lightning connection system according to claim 23, wherein said first and second force transferring means extend in a parallel direction from the base support part.

28. The lightning connection system according to claim 23, said first and second force transferring means extend angled in relation to each other from the base support part between 0 and 90 degrees.

29. The lightning connection system according to claim 12, wherein said force transferring means are bendable in one direction in relation to a stable position.

30. The lightning connection system according to claim 12, wherein the contact means being moveable in at least one direction by the bending of said force transferring means and said base support part defining a fixed position for said force transferring means.

31. The lightning connection system according to claim 12, wherein at least a section of said force transferring means comprise a circular shape or establish a circular shape when exposed to a force at the contact means.

32. The lightning connection system according to claim 12, wherein said force transferring means are made in a flexible material.

33. The lightning connection system according to claim 12, wherein said force transferring means comprises one or more boards with a length between 200 and 500 millimeters, a width between 50 and 300 millimeters and a thickness between 3 and 10 millimeters.

34. The lightning connection system according to claim 12, wherein said force transferring means comprise at least one gas filled valve.

35. The lightning connection system according to claim 34, wherein said force transferring means comprise at least one spring actuated means.

36. The lightning connection system according to claim 35, wherein said at least one gas filled valve or said at least one spring actuated means comprise piston means including contact means.

37. The lighting connection system according to claim 12 wherein said wind turbine comprises wind turbine blades that are pitch controlled.

38. A method of establishing a continuous contact between rotating and stationary lightning protection means of a wind turbine, said method comprising:
- establishing a first contact between a contact surface of said rotating lightning protection means and at least one contact means with the use of force transferring means,
- establishing a second contact between a contact surface of said stationary lightning protection means and at least one contact means with the use of force transferring means, and
- connecting said at least two contact means in contact with the rotating and stationary lightning protection means by establishing a dedicated connection between said at least two contact means wherein said force transferring means are made of an electrically insulating material.

39. The method according to claim 38, where a common base support part establishes support for said force transferring means.

40. Method according to claim 38, further comprising pitch controlling wind turbine blades of which of said wind turbine.

* * * * *